(12) United States Patent
Snyder et al.

(10) Patent No.: US 11,042,896 B1
(45) Date of Patent: Jun. 22, 2021

(54) CONTENT INFLUENCER SCORING SYSTEM AND RELATED METHODS

(71) Applicant: INMAR CLEARING, INC., Winston-Salem, NC (US)

(72) Inventors: Brent Snyder, Rogers, AR (US); Irving Turner, Bentonville, AR (US)

(73) Assignee: INMAR CLEARING, INC., Winston-Salem, NC (US)

( * ) Notice: Subject to any disclaimer, the term of this patent is extended or adjusted under 35 U.S.C. 154(b) by 498 days.

(21) Appl. No.: 15/918,619

(22) Filed: Mar. 12, 2018

(51) Int. Cl.
    G06Q 30/02 (2012.01)
(52) U.S. Cl.
    CPC ..... *G06Q 30/0242* (2013.01); *G06Q 30/0243* (2013.01); *G06Q 30/0244* (2013.01); *G06Q 30/0251* (2013.01)
(58) Field of Classification Search
    CPC .............. G06Q 30/0242; G06Q 30/0252
    See application file for complete search history.

(56) References Cited

U.S. PATENT DOCUMENTS

| | | | | |
|---|---|---|---|---|
| 7,289,985 | B2 * | 10/2007 | Zeng | G06F 16/951 707/749 |
| 7,428,529 | B2 * | 9/2008 | Zeng | G06F 16/3322 |
| 9,449,096 | B2 | 9/2016 | Balmin et al. | |
| 9,514,133 | B1 * | 12/2016 | Kursun | G06F 40/134 |
| 9,519,936 | B2 | 12/2016 | Vijayaraghavan et al. | |
| 9,779,411 | B1 * | 10/2017 | Zhao | G06Q 30/0247 |
| 10,366,421 | B1 * | 7/2019 | Wu | G06Q 30/0271 |
| 2002/0184267 | A1 * | 12/2002 | Nakao | G06F 16/345 715/255 |

(Continued)

FOREIGN PATENT DOCUMENTS

| | | | | |
|---|---|---|---|---|
| KR | 10-2034120 B1 | * | 10/2019 | ............ G06Q 30/02 |
| WO | WO 2018/136011 A1 | * | 7/2018 | ......... G06Q 30/0251 |
| WO | WO 2019/066335 A1 | * | 4/2019 | ............ G06Q 30/02 |

OTHER PUBLICATIONS

Social media and customer behavior analytics for personalized customer engagements; Buckley et al., IBM J. Res. & Dev. vol. 58 No. 5/6 Paper 7 Sep./Nov. 2014.*

*Primary Examiner* — David J Stoltenberg
(74) *Attorney, Agent, or Firm* — Allen, Dyer, Doppelt + Gilchrist, P.A.

(57) ABSTRACT

A content influencer scoring system may include influencer computers each associated with a respective content influencer having influencer historical performance data and legacy influencer content associated therewith. A remote server may obtain advertisement campaign data associated with an advertisement campaign and parse the advertisement campaign data for advertisement keywords. The remote server may match content influencers to the advertisement campaign data based on the advertisement keywords and, for each content influencer, generate an advertisement campaign score. The score may be generated by determining whether the content influencer is suitable for the advertisement campaign based upon a term frequency of the advertisement keywords for each document from the legacy influencer content, and frequency of the advertisement keywords across the documents, and when suitable, determining whether the advertisement campaign score based upon the historical performance data to generate the advertisement campaign score.

18 Claims, 6 Drawing Sheets

(56) References Cited

U.S. PATENT DOCUMENTS

| | | | | |
|---|---|---|---|---|
| 2005/0234972 A1* | 10/2005 | Zeng | | G06F 16/951 |
| 2006/0259473 A1* | 11/2006 | Li | | G06Q 30/02 |
| 2007/0288454 A1* | 12/2007 | Bolivar | | G06Q 30/02 |
| 2008/0140506 A1* | 6/2008 | Christianson | | G06Q 30/02 |
| | | | | 705/14.44 |
| 2008/0147487 A1* | 6/2008 | Hirshberg | | G06Q 30/02 |
| | | | | 705/14.53 |
| 2011/0161159 A1* | 6/2011 | Tekiela | | G06Q 30/0242 |
| | | | | 705/14.41 |
| 2011/0213655 A1* | 9/2011 | Henkin | | G06Q 30/0251 |
| | | | | 705/14.49 |
| 2012/0209674 A1* | 8/2012 | Neystadt | | G06Q 50/01 |
| | | | | 705/14.16 |
| 2013/0073378 A1* | 3/2013 | Naveh | | G06Q 10/10 |
| | | | | 705/14.41 |
| 2013/0103667 A1* | 4/2013 | Minh | | H04L 51/32 |
| | | | | 707/709 |
| 2013/0110583 A1* | 5/2013 | Ormont | | G06Q 30/0251 |
| | | | | 705/7.29 |
| 2013/0110641 A1* | 5/2013 | Ormont | | G06Q 50/01 |
| | | | | 705/14.66 |
| 2013/0254283 A1* | 9/2013 | Garcia-Martinez | | G06Q 50/01 |
| | | | | 709/204 |
| 2014/0006176 A1* | 1/2014 | Gudlavenkatasiva | | G06Q 30/02 |
| | | | | 705/14.73 |
| 2014/0095307 A1* | 4/2014 | Dodson | | G06Q 30/0255 |
| | | | | 705/14.53 |
| 2014/0173642 A1* | 6/2014 | Vinson | | H04N 21/44222 |
| | | | | 725/9 |
| 2014/0180827 A1* | 6/2014 | Wong | | G06Q 30/0269 |
| | | | | 705/14.66 |
| 2014/0358698 A1* | 12/2014 | Murphy | | G06Q 30/0275 |
| | | | | 705/14.71 |
| 2015/0058417 A1* | 2/2015 | McConnell | | H04L 67/306 |
| | | | | 709/204 |
| 2015/0193535 A1* | 7/2015 | Balmin | | G06F 16/9535 |
| | | | | 707/706 |
| 2015/0347593 A1* | 12/2015 | Tsai | | G06Q 50/01 |
| | | | | 707/722 |
| 2015/0356571 A1* | 12/2015 | Chang | | H04L 51/32 |
| | | | | 705/7.29 |
| 2016/0019579 A1* | 1/2016 | Sims | | G06Q 30/0242 |
| | | | | 705/14.41 |
| 2016/0034974 A1* | 2/2016 | Neb | | G06Q 30/0214 |
| | | | | 705/14.16 |
| 2016/0071162 A1* | 3/2016 | Ogawa | | G06Q 50/01 |
| | | | | 705/14.66 |
| 2016/0117397 A1* | 4/2016 | Bansal | | G06F 16/9535 |
| | | | | 707/723 |
| 2016/0148222 A1* | 5/2016 | Davar | | G06Q 30/0201 |
| | | | | 705/7.32 |
| 2016/0162929 A1* | 6/2016 | takiela | | G06Q 30/02 |
| | | | | 705/14.43 |
| 2016/0306888 A1* | 10/2016 | Balmin | | G06Q 30/0201 |
| 2016/0321284 A1* | 11/2016 | Spears | | G06Q 30/0246 |
| 2016/0321734 A1* | 11/2016 | Dumon et al. | | G06Q 30/0629 |
| 2016/0345075 A1* | 11/2016 | Kitts | | H04N 21/252 |
| 2016/0359790 A1* | 12/2016 | Zhang | | G06Q 30/0252 |
| 2017/0024749 A1* | 1/2017 | Barathy | | G06Q 30/0201 |
| 2017/0083943 A1* | 3/2017 | Bosworth | | G06Q 30/0255 |
| 2017/0116650 A1* | 4/2017 | Garcia-Martinez | | G06Q 30/0269 |
| 2017/0180495 A1* | 6/2017 | Comstock | | H04L 67/02 |
| 2017/0180496 A1* | 6/2017 | Comstock | | H04L 67/22 |
| 2017/0180497 A1* | 6/2017 | Comstock | | H04L 67/42 |
| 2017/0214752 A1* | 7/2017 | Longo | | G06F 16/9537 |
| 2017/0221096 A1* | 8/2017 | Bosworth | | H04L 67/306 |
| 2017/0262899 A1* | 9/2017 | Geraghty | | G06N 5/047 |
| 2017/0270571 A1* | 9/2017 | Melo | | G06Q 30/0631 |
| 2017/0286539 A1* | 10/2017 | Smith | | G06Q 50/01 |
| 2017/0323312 A1 | 11/2017 | Penumaka et al. | | |
| 2017/0331909 A1 | 11/2017 | Iadonisi et al. | | |
| 2018/0047114 A1* | 2/2018 | Haaland | | G06Q 50/01 |
| 2018/0068344 A1* | 3/2018 | Sultzaberger | | G06F 16/7867 |
| 2018/0150870 A1* | 5/2018 | Haaland | | G06Q 10/06393 |
| 2018/0204243 A1* | 7/2018 | Haaland | | G06Q 30/0277 |
| 2018/0240147 A1* | 8/2018 | Stevens | | G06Q 50/01 |
| 2018/0293607 A1* | 10/2018 | Huddleston | | G06Q 50/01 |
| 2018/0308122 A1* | 10/2018 | Moore | | G06Q 30/0242 |
| 2018/0341987 A1* | 11/2018 | Marella | | G06Q 30/0269 |
| 2019/0012746 A1* | 1/2019 | Sullivan | | G06Q 50/01 |
| 2019/0026786 A1* | 1/2019 | Khoury | | G06Q 30/0277 |
| 2019/0050911 A1* | 2/2019 | Fuller | | G06Q 50/01 |
| 2019/0080366 A1* | 3/2019 | Zhou | | G06Q 50/01 |
| 2019/0114651 A1* | 4/2019 | Eyal | | G06Q 50/01 |
| 2019/0156351 A1* | 5/2019 | Akkiraju | | G06Q 50/01 |
| 2020/0111121 A1* | 4/2020 | Ben-Itzhak | | G06Q 30/0269 |

* cited by examiner

FIG. 3

| APPLICANT | FIT ▼ | REACH 53 SOCIAL SITES | STATUS 56 | CL NOTES 54 | CM NOTES | ROUNDS 55 |
|---|---|---|---|---|---|---|
| KRISTIN COOPER | 97.4 | ① 557 K<br>② 0<br>③ 0<br>④ 9.74 K<br>⑤ 36.8 K | ○ DENIED | BLOG CATEGORY<br>COUPON BLOGGER-BETTER FIT FOR PROMO. | | ROUND 5 (5/5) |
| JESSICA CROSS | 96.0 ☆ 52 | ① 709 K<br>② 0<br>③ 0<br>④ 1.83 K<br>⑤ 22.8 K | ○ APPROVED | BLOG CATEGORY<br>CONTENT QUALITY<br>DEMOGRAPHICS<br>PICTURE QUALITY<br>7 CAN CHICKEN ENCHILADA SOUP-CANNED CHICKEN, PACE, V8. I FOOD BLOG. WELL STAGED PHOTOS. GREAT QUALITY. RECIPES ARE VERY FAMILY FRIENDLY. | | ROUND 5 (5/5) |
| ASHLEA KONECHY | 92.0 | ① 326 K<br>② 0<br>③ 0<br>④ 1.53 K<br>⑤ 18 K | ○ DENIED | APPLICATION LACKING-NO RECIPE IDEA PROVIDED | | ROUND 5 (5/5) |
| RUCHI DUA | 89.7 | ① 292 K<br>② 0<br>③ 0<br>④ 772<br>⑤ 8.83 K | ○ CLIENT APPROVED | | GREAT REACH AND QUALITY! 1. CHICKEN TACOS (WITH PACE AND SWANSON CANNED CHICKEN) 2. SKILLET CHICKEN MEATBALLS (WITH SWANSON CANNED CHICKEN AND BROWN SAUCE) | ROUND 5 (5/5) |

CONTENT INFLUENCER SCORING SYSTEM AND RELATED METHODS

TECHNICAL FIELD

The present invention relates to the field of electronics, and more particularly, to the processing of influencer content and related methods.

BACKGROUND

Sales of a particular product or service may be based upon how well that product or service is marketed to a consumer. One form of marketing is called influencer marketing. Influencer marketing enables a brand, for example, to connect with potential customers.

Bloggers, for example, may be considered one type of highly regarded influencer. In many instances, a consumer may trust an influencer, such as a blogger, over other types of content, for example, brand content. An influencer may address the shortcomings of brand content or a typical marketing campaign by using the influencer's media reach to educate consumers on the given product and/or provide positive feedback about the given product.

A blogger, for example, may generate content for more than one brand. A blogger may also provide feedback in the form of a review that may not be helpful to a particular brand or marketing campaign. Even still further, a blogger may have previously blogged about a sensitive topic (e.g., political) unrelated to brand content or a marketing campaign.

U.S. Patent Application Publication No. 2016/0034974 to Neb is directed to a system for providing an influencer with an offer to endorse a brand's product or service. More particularly, Neb discloses selecting an influencer to endorse at least one product or service by an influencer-brand metric. The influencer brand metric includes identifiers to evaluate an influencer's awareness, appeal and relevance to a brand's image and their influence on consumer buying behavior. Each identifier may maintain a score to evaluate the influencers appeal and relevance. The influencer-brand metric includes static identifiers and dynamic identifiers, with both defining a score for an influencer suitable for endorsing a brand's product or service. The static identifiers include one or more of the following identifiers: endorsements completed, active presence on social websites, number of followers/fan/friends, hiring expenditure cost and success rate. The dynamic identifiers include one or more of the following identifiers: location, age, product category match, previous association between brand and influencer and competitive analysis.

SUMMARY

A content influencer scoring system may include a plurality of influencer computers each associated with a respective content influencer and configured to receive respective influencer content associated with a given product for purchase. Each content influencer may have influencer historical performance data and legacy influencer content associated therewith. The system may also include a remote server coupled to each of the plurality of influencer computers and configured to obtain advertisement campaign data associated with an advertisement campaign for a given advertiser and parse the advertisement campaign data for a plurality of advertisement keywords. The remote server may also be configured to match content influencers to the advertisement campaign data based on the plurality of advertisement keywords, and for each content influencer, generate an advertisement campaign score. The advertisement campaign score may be generated by at least determining whether the content influencer is suitable for the advertisement campaign based upon a term frequency (TF) of the advertisement keywords for each of a plurality of documents from the legacy influencer content, and based upon a document frequency (DF) of the advertisement keywords across the plurality of documents, and when the content influencer is determined to be suitable, determining the advertisement campaign score based upon the historical performance data to generate the advertisement campaign score.

The remote server may be configured to determine whether the advertisement campaign score based upon a logistic regression using the historical performance data, for example. The remote server may be configured to determine whether the content influencer is suitable by at least generating a cosine similarity matrix based upon the TF and the DF, for example.

The remote server may be configured to, when a content influencer has less than a threshold amount of historical performance data, communicate with a further remote server to determine whether the content influencer is suitable for the advertisement campaign based upon the plurality of advertisement keywords. The remote sever may be configured to determine whether the advertisement campaign score based upon further historical performance data from the further remote server. The further historical performance data may include at least one of social reach and page views, for example.

The remote server may be configured to rank the content influencers in order based upon respective advertisement campaign scores. The remote server may be configured to communicate, to the advertiser for display, the content influencers in an order based upon the respective advertisement campaign scores, for example. The historical performance data may include at least one of page-views, social followers, time-on-content, amplification rate, for example.

The remote server may be configured to generate a request for influencer content based upon the advertisement campaign data, accept applications from the plurality of content influencers for the request for influencer content, and permit the advertiser to selectively accept or deny accepted applications from ones of the plurality of content influencers that have accepted applications. The remote server may be configured to obtain the advertisement campaign data as natural language text, and parse the advertisement campaign data for the plurality of advertisement keywords based upon natural language processing.

A method aspect is directed to a method of scoring content influencers in a system that includes a plurality of influencer computers each associated with a respective content influencer and configured to receive respective influencer content associated with a given product for purchase. Each content influencer may have influencer historical performance data and legacy influencer content associated therewith. The method may include using a remote server coupled to each of the plurality of influencer computers to obtain advertisement campaign data associated with an advertisement campaign for a given advertiser and parse the advertisement campaign data for a plurality of advertisement keywords. The method may also include using the remote server to match content influencers to the advertisement campaign data based on the plurality of advertisement keywords, and, for each content influencer generate an advertisement campaign score. The advertisement campaign score may be generated by at least determining whether the content influencer is suitable for the advertisement campaign based upon a term frequency (TF) of the advertisement keywords for each of a plurality of documents from the legacy influencer content, and based upon a document frequency (DF) of the advertisement keywords across the plurality of documents, and, when the content influencer is determined to be suitable, determining whether the advertisement campaign score based upon the historical performance data to generate the advertisement campaign score.

A computer readable medium aspect is directed to a non-transitory computer readable medium for a content influencer scoring system that includes a plurality of influencer computers each associated with a respective content influencer and configured to receive respective influencer content associated with a given product for purchase. Each content influencer may have influencer historical performance data and legacy influencer content associated therewith. The non-transitory computer readable medium may include computer executable instructions that when executed by a processor of a remote server coupled to each of the plurality of influencer computers causes the processor to perform operations. The operations may include obtaining advertisement campaign data associated with an advertisement campaign for a given advertiser and parsing the advertisement campaign data for a plurality of advertisement keywords. The operations may also include matching content influencers to the advertisement campaign data based on the plurality of advertisement keywords, and, for each content influencer, generating an advertisement campaign score. The advertisement campaign score may be generated by at least determining whether the content influencer is suitable for the advertisement campaign based upon a term frequency (TF) of the advertisement keywords for each of a plurality of documents from the legacy influencer content, and based upon a document frequency (DF) of the advertisement keywords across the plurality of documents, and, when the content influencer is determined to be suitable, determining the advertisement campaign score based upon the historical performance data to generate the advertisement campaign score.

BRIEF DESCRIPTION OF THE DRAWINGS

FIG. 3 is a display including content influencers ordered based upon respective advertisement campaign scores communicated from the remote server of FIG. 2

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
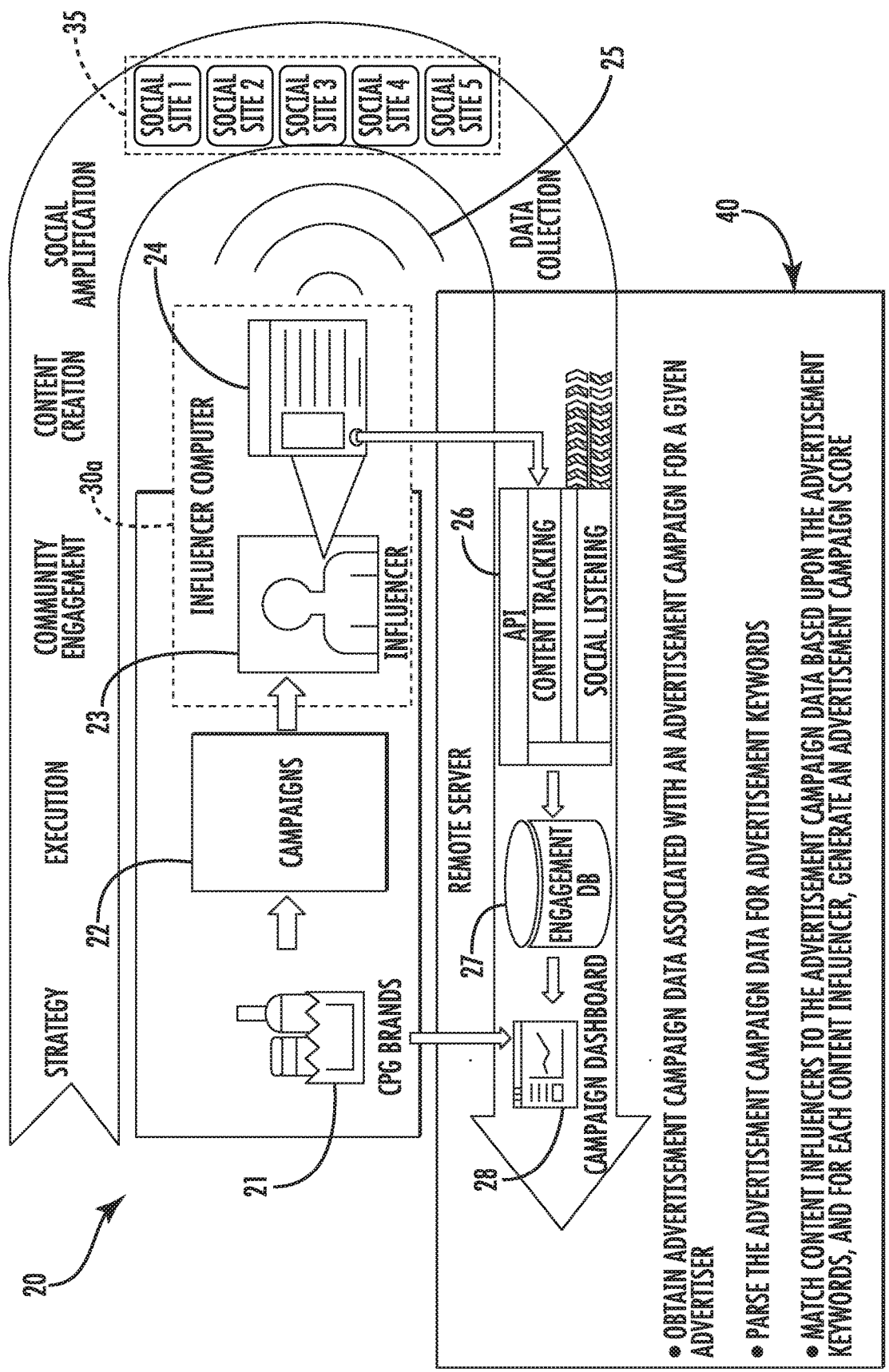
FIG. 1 is a schematic diagram of a content influencer system according to an embodiment.

Referring initially to FIG. 1, a content influencer scoring system 20 may be particularly advantageous for influencing a purchaser. Such a system 20 may be implemented in various stages, each of which will be described. A first stage, strategy to pursue an advertising campaign, involves an advertiser or brand 21, such as, for example, a consumer package goods (CPG) brand. The CPG brand 21 executes an advertisement campaign 22 in an execution stage. The advertisement campaign 22 may include one or more content influencers 23 which are chosen based on certain elements in a community engagement stage. Further details of the how content influencers 23 are chosen will be described in further detail below.

In a content creation stage, the influencer creates influencer content 24. In a social amplification stage 25, the influencer content 24 is sent to users (e.g., purchaser computers 35) and shared, for example, by email, social media, etc. A remote server 40 may collect data in a data collection stage, which may provide an application programming interface (API) 26 for content tracking and social listening. Collected data may be stored in an engagement database 27 of the remote server 40. A campaign dashboard 28 may be provided, for example, to the CPG brand 21 to gauge effectiveness of the advertisement campaign 22. Further details of the content influencer scoring system 20 including the remote server 40 will be described below.

Figure 2:
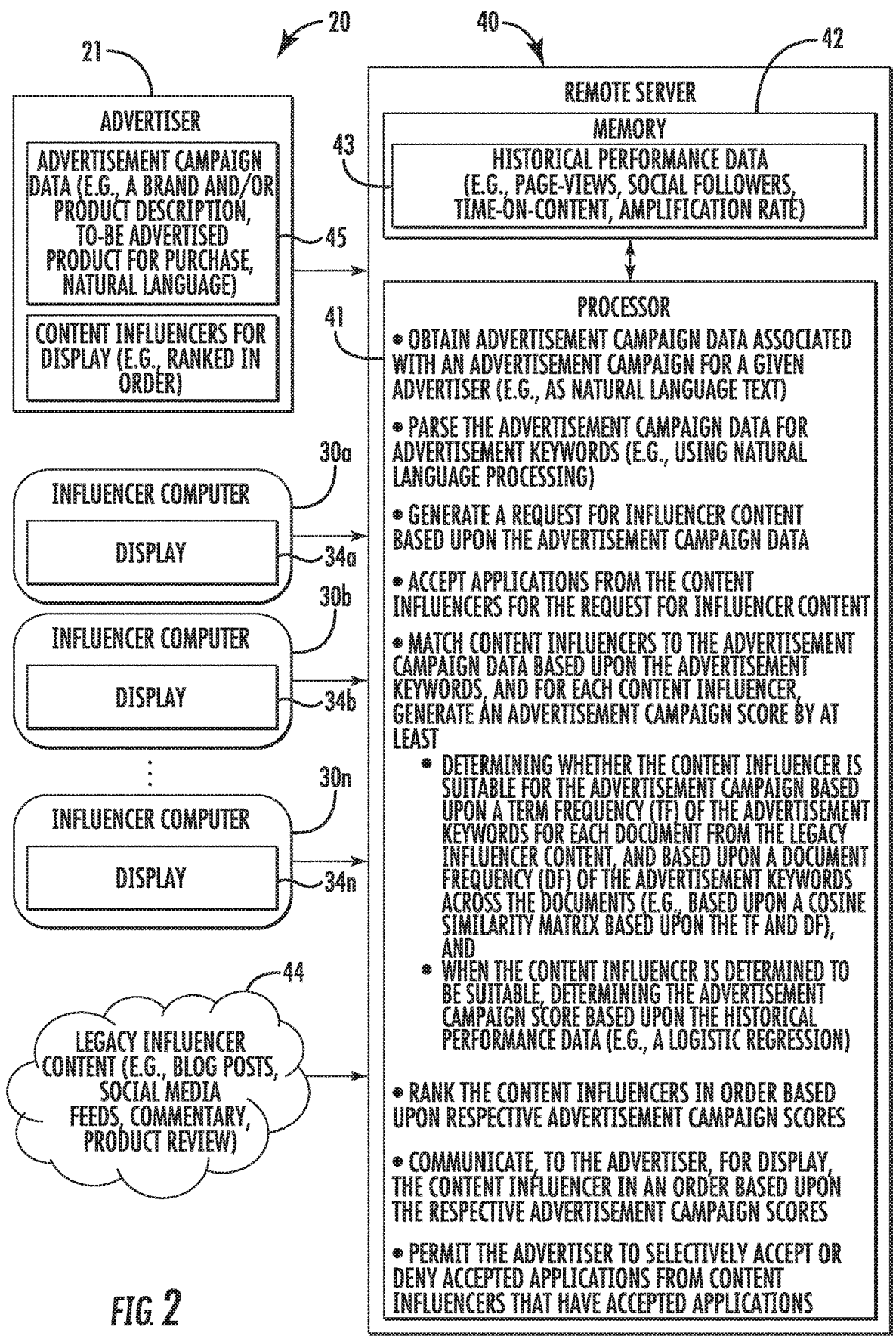
FIG. 2 is a more detailed schematic diagram of the system of FIG. 1.

Referring additionally to FIGS. 2 and 3, the content influencer scoring system 20 illustratively includes influencer computers 30a-30n. Each influencer computer 30a-30n includes a memory, a processor coupled to the memory, and an input device, such as, for example, a virtual or physical keyboard. Each content influencer computer may also include a display 34a-34n coupled to the processor as will be appreciated by those skilled in the art, an influencer computer 30a-30n may be any of a personal computer (PC), tablet computer, and a smartphone. Of course, each influencer computer 30a-30n may be another type of computer and may each be a different type.

Each influencer computer 30a-30n is associated with respective influencer content 24 and configured to receive respective influencer content associated with a given product for purchase. As will be appreciated by those skilled in the art, an influencer is termed as such because an influencer typically has a relatively large following and the ability to influence their followers through their content (i.e., influencer content). For example, a relatively strong influencer may be an advocate for the given product for purchase, and that influencer may be more influential to potential buyers of the given product as compared to a static advertisement. It should be appreciated that while a given product for purchase is described herein, a product for purchase may include a service or have a service component.

A content influencer 23 may be a blogger, for example, and provide blog posts as the influencer content 24. The influencer content 24 may also include written content and image content and have certain influencer characteristics associated therewith. Exemplary influencer characteristics may include the type of influencer content 24 (blog, article, email, social media post, etc.), the content type (e.g., recipe, how-to, etc.), and/or the type of product for purchase associated with the influencer content (e.g., food, household item). The influencer characteristics may include other and/or additional characteristics.

In one example, the content influencer 23 may be a food blogger and may provide a recipe that uses a Brand-X ingredient. In other examples, the influencer content 24 may be or include a tutorial using the given product for purchase and/or an article about a related item or service to the given product for purchase. Of course, the influencer content 24 may be other and/or additional types of content, for example, social media posts, etc.

Each content influencer 23 has influencer historical performance data 43 associated therewith. The historical performance data 43 may be stored in a memory 42 of the remote server 40. The historical performance data 43 may include any one or more of page-views, social followers, time-on-content, and amplification rate. The historical performance data 43 may be collected based upon legacy influencer content 44 associated with each content influencer 23. For example, if a given content influencer 23 has previously published influencer content 24 within the system 20 (i.e., legacy influencer content 44), the remote server 40 may determine and store data corresponding to the performance of the content influencers.

The remote server 40 is coupled to each of the influencer computers 30a-30n, for example, over a communications network, such as, the Internet. The remote server 40 includes a processor 41 coupled to the memory 42. While functions of the remote server 40 are described herein, it should be appreciated by those skilled in the art that the functions are performed through cooperation of the processor 41 and memory 42.

Figure 4:
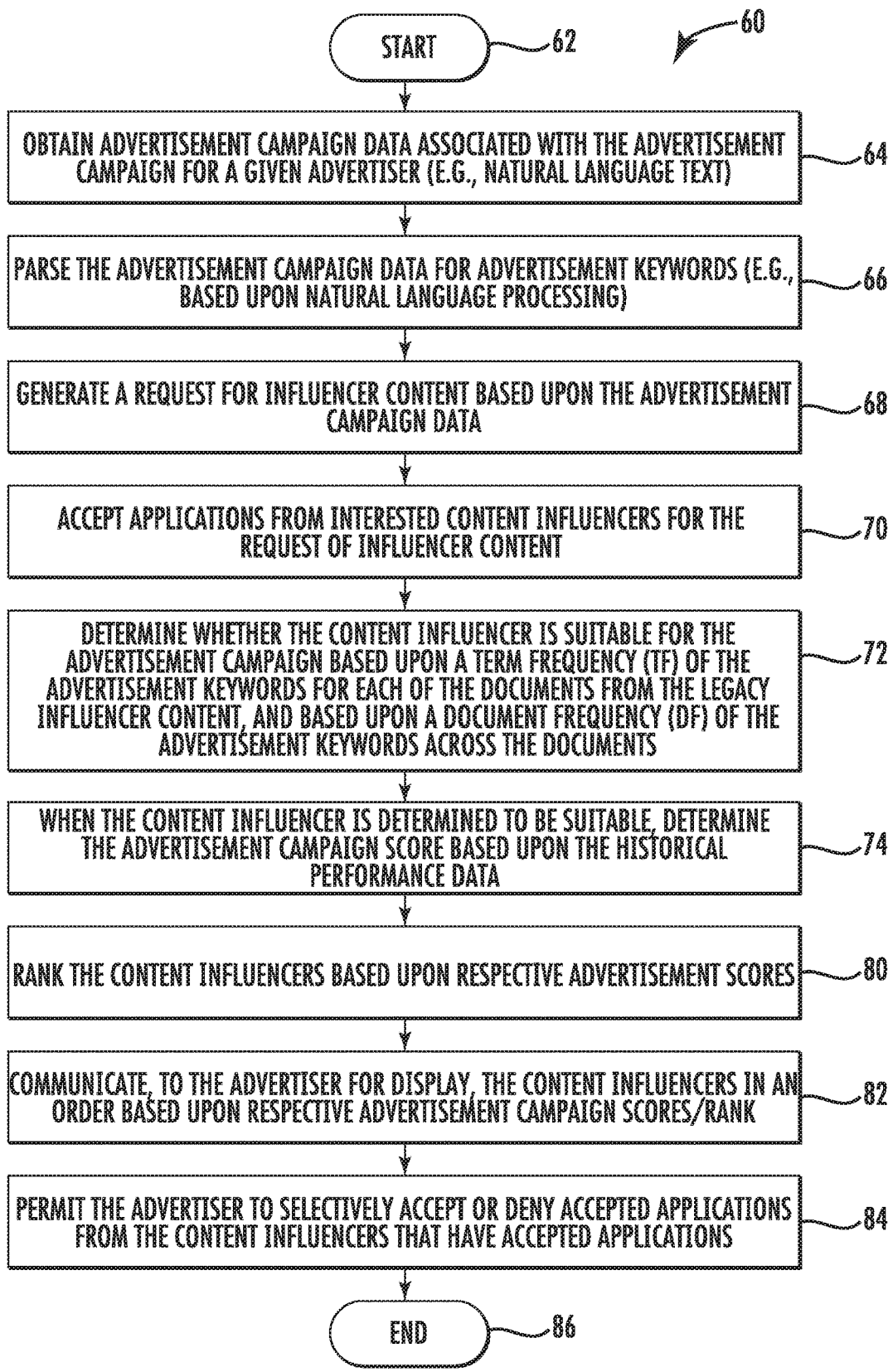
FIG. 4 is a flow chart illustrating operation of the remote server of FIG. 2.

Referring now additionally to the flowchart 60 in FIG. 4, beginning at Block 62, details of operation of the content influencer scoring system 20 with respect to the remote server 40 and selection of a content influencer 23 for an advertisement campaign 22 will now be described. At Block 64, the remote server 40 obtains advertisement campaign data 45 associated with the advertisement campaign 22 for a given advertiser 21. The advertisement campaign data 45 may be obtained as natural language text. For example, the advertiser 21 may provide as input to the remote server 40 a text string along the lines of "I would like a campaign including bloggers for cake." The remote server 40, at Block 66, parses the advertisement campaign data 45 for advertisement keywords, for example, based upon natural language processing. For example, the remote server 40 may parse for nouns, such as, in the above example, "cake." Other terms or keywords may be generated or parsed, for example, synonyms of one or more keywords (e.g., in the above example, cookies, dessert, sweets, etc.).

At Block 68, the remote server 40 generates a request for influencer content 24 based upon the advertisement campaign data 45. More particularly, the remote server 40 may communicate an electronic message and/or posting for content influencers 23 to apply to create influencer content 24 for the advertising campaign 22 (i.e., the given product). The remote server 40 accepts applications from interested content influencers 23 for the request for influencer content 24 (Block 70). For example, interested content influencers 23 may, by way of respective influencer computers 30a-30n, apply to be a content influencer for the advertising campaign 22, wherein the applications are communicated from the respective influencer computers to the remote server 40.

The remote server 40 matches content influencers 23 (e.g., content influencers that have made application) to the advertisement campaign data 45 based on the advertisement keywords, and for each content influencer 23, generates an advertisement campaign score (Blocks 72, 74). As will be appreciated by those skilled in the art, matching content influencers 23 with a brand or retailer 21 (i.e., an advertising campaign 22) typically requires an understanding of a potential content influencer's interests and whether they have a high probability of performing well relative to other content influencers who have also applied to the request for influencer content for the advertisement campaign.

The remote server 40 matches the content influencers 23 to advertisement campaign data 45 by determining whether the content influencer 23 is suitable for the advertisement campaign 22 (Block 72). The determination of suitability determines an affinity for particular brands, products, and lifestyle themes, for example, and based upon the natural language processing text analysis. To determine suitability, the remote server 40 applies a term frequency (TF) of the advertisement keywords for each of a plurality of documents (e.g., blog posts) from the legacy influencer content 44. The TF measures the frequency of the words or terms in any given document.

Suitability is also determined based upon a document frequency (DF) of the advertisement keywords across the documents. The DF, which may also be referred to as an inverse document frequency (IDF), measures the uniqueness of a word or term. In other words, the IDF measures how infrequently the word or term occurs across all the documents (e.g., all blog posts by the given content influencer 23).

The remote server 40 multiplies the TF by the IDF. The product of the TF and IDF for a given keyword or term provides a relative measure of how frequent that keyword is used in the document multiplied by how unique the keyword is in the entire corpus of all documents (i.e., collection of documents or influencer content). This measure advantageously may provide a relative importance of the keyword in the document compared to other documents. In particular, the measure may be determined by:

$$W_{x,y} = tf_{x,y} \times \log(N/df_x)$$

wherein $tf_{x,y}$ is the frequency of the term x within document y, $df_x$ is the number of documents that include the term or keyword, and N is the total number of documents.

The remote server 40, also as part of the suitability determination, generates a cosine similarity matrix based upon the TF and IDF. More particularly, the TF-IDF (i.e., product) information is converted into a similarity matrix. The cosine similarity between two vectors (or two documents on the vector space) is a measure that calculated the cosine of the angle between the terms present in them. The cosine similarity matrix uses a matrix of 0s and 1s which measures the angular distance of words to match affinities between prior advertising campaigns and content influencers.

When the content influencer 23 is determined to be suitable at Block 72, the remote server 40 determines whether the content influencer is capable for the advertisement campaign 22 based upon the historical performance data 43 to generate the advertisement campaign score. More particularly, the remote server 40 determines capability based upon a logistic regression using the historical performance data 43. Using a logistic regression advantageously may provide interoperability of coefficients, operational efficacy, and increased speed as compared to other classification models, as will be appreciated by those skilled in the art. The following equation represents the logistic regression:

$$P(X) = \frac{1}{1 + e^{-(\alpha + \beta_1 X_1 + \beta_2 X_2 + \beta_3 X_3)}}$$

wherein P(X) is the dependent variable or outcome, $\beta_1 x_1$ is the product of the first feature and first weight, $\beta_2 x_2$ is the product of the second feature and second weight and so on. Capability may be considered a measure of performance of a given content influencer 23 relative to other content influencers (e.g., in-network).

The advertisement campaign score for a given content influencer 23 is defined by P(X). Example results for P(X) are 0.98, 0.75, and 0.63. The P(X) results may be normalized to a 0-100 scale. The advertisement campaign score represents the probability that the corresponding content influencer 23 will perform in the top half of all advertisement campaign participants. For example, if a given content influencer 23 has a score or P(X) of 0.63, they would have a 63% probability of being in the top half of any given advertising campaign. As another example, if a given content influencer 23 had a score of 0.98, they have a 98% probability of being in a top half of any given campaign.

Exemplary features or types of historical performance data 43 for input into the logistic regression may include page-views, a number of social followers, an amplification rate, and amount of time spent by users on the influencer content. Content influencer membership and engagement may also be considered as inputs to the logistic regression, for example, application rate, percent of denied applications, and length of time as a content influencer 23 with the remote server 40 (i.e., in-network). Potential audience or users may also be used as inputs to the logistic regression, for example, network centrality metrics, location, gender, and/or age. Other features may include a history of the content influencer's cost per post, cost per view, and cost per engagement, content influencer's bid for the advertising campaign, content attributes (e.g., photography sharpness, focus, and depth of field, and blog layout/design), and prior engagement history (e.g., ability to follow instructions, timeliness, and typographical errors). Of course, any number of input and types of inputs may be provided to the logistic regression.

However, it may be desirable to reduce a relatively large number of inputs or features to the logistic regression, for example, for increased processing speed. Accordingly, the features or inputs may be reduced to three features: mean performance percentile, mean competitive rank, and the square root of the number of home page views of the content influencer.

Once the advertisement campaign scores are generated for each content influencer 23 by the remote server 40, the remote server ranks the content influencers based upon respective advertisement campaign scores, for example, with the content influencer having the highest score first in a list (Block 80). At Block 82, the remote sever 40 communicates, to the advertiser 21 for display on a display 46, for example, of an advertiser computer, the content influencers 23 in order based upon the respective advertisement campaign scores 51. A star 52 next to a content influencer's advertisement campaign score 51 is indicative of an affinity to the advertiser by either or both of category and brand. A reach 53 is also communicated for display, for example, social media reach on respective social media platforms. Notes 54, both client and content manager, for each content influencer 23 may also be displayed along with a current round of selection 55.

At Block 84, the remote server 40 permits the advertiser 21 to selectively accept/approve or deny the accepted applications from the content influencers 23 that have accepted applications. The status 56 may be displayed. The process ends at Block 86.

As will be appreciated by those skilled in the art, the content influencer scoring system 20 advantageously may provide increased matching or connection of brands and retailers with content influencers that have a relatively loyal social following. In other words, the system 20 may provide more consistent and higher quality of matching relatively to conventional techniques. Conventional matching approaches for selection of content influencers 23 vary widely with respect to quality, and the highly accurate matching (i.e., quality) cannot by typically replicated, for example, using an automated routine and machine learning as in the present system 20.

Figure 5:
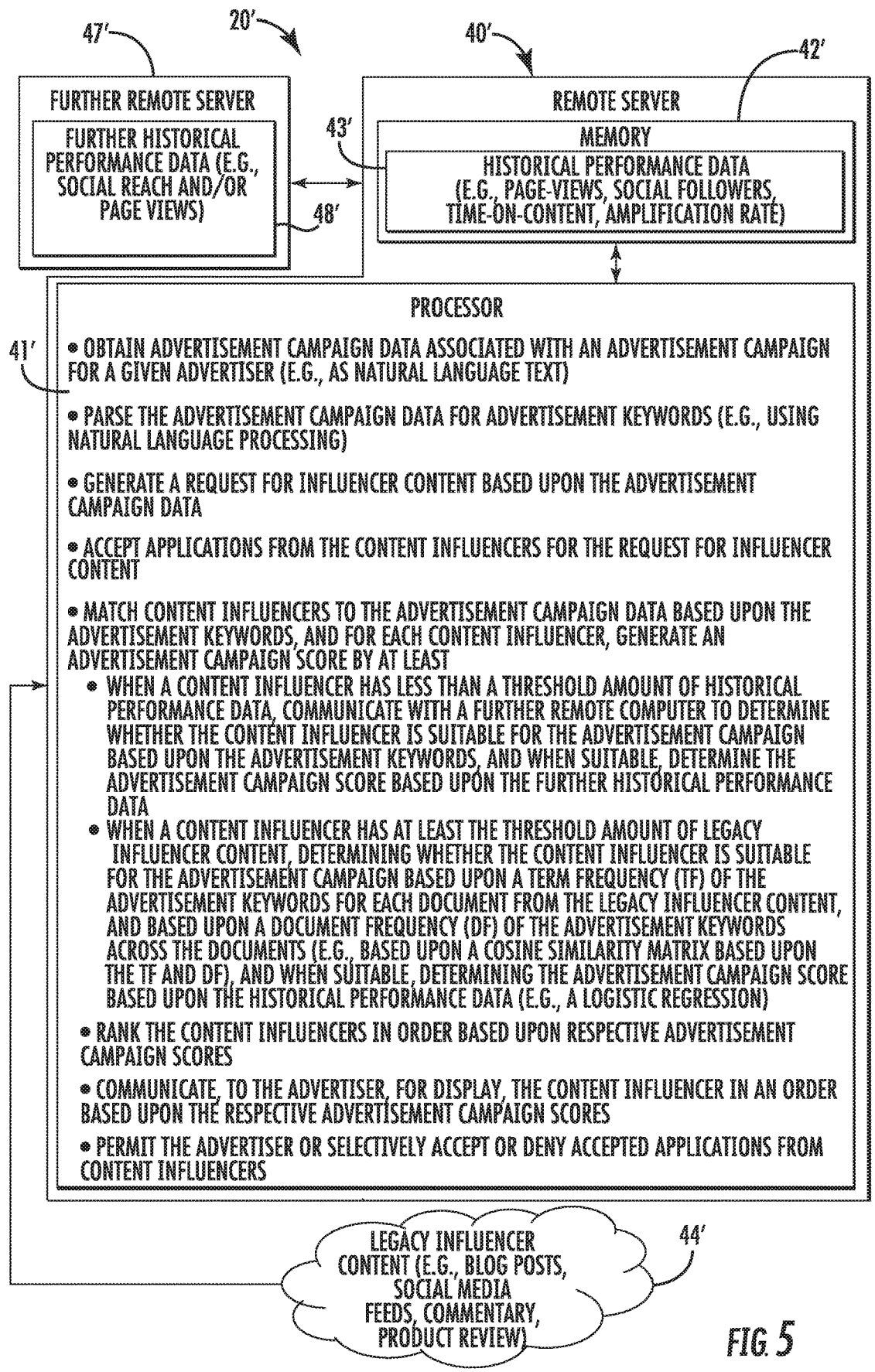
FIG. 5 is a schematic diagram of a content influencer system according to another embodiment.
Figure 6:
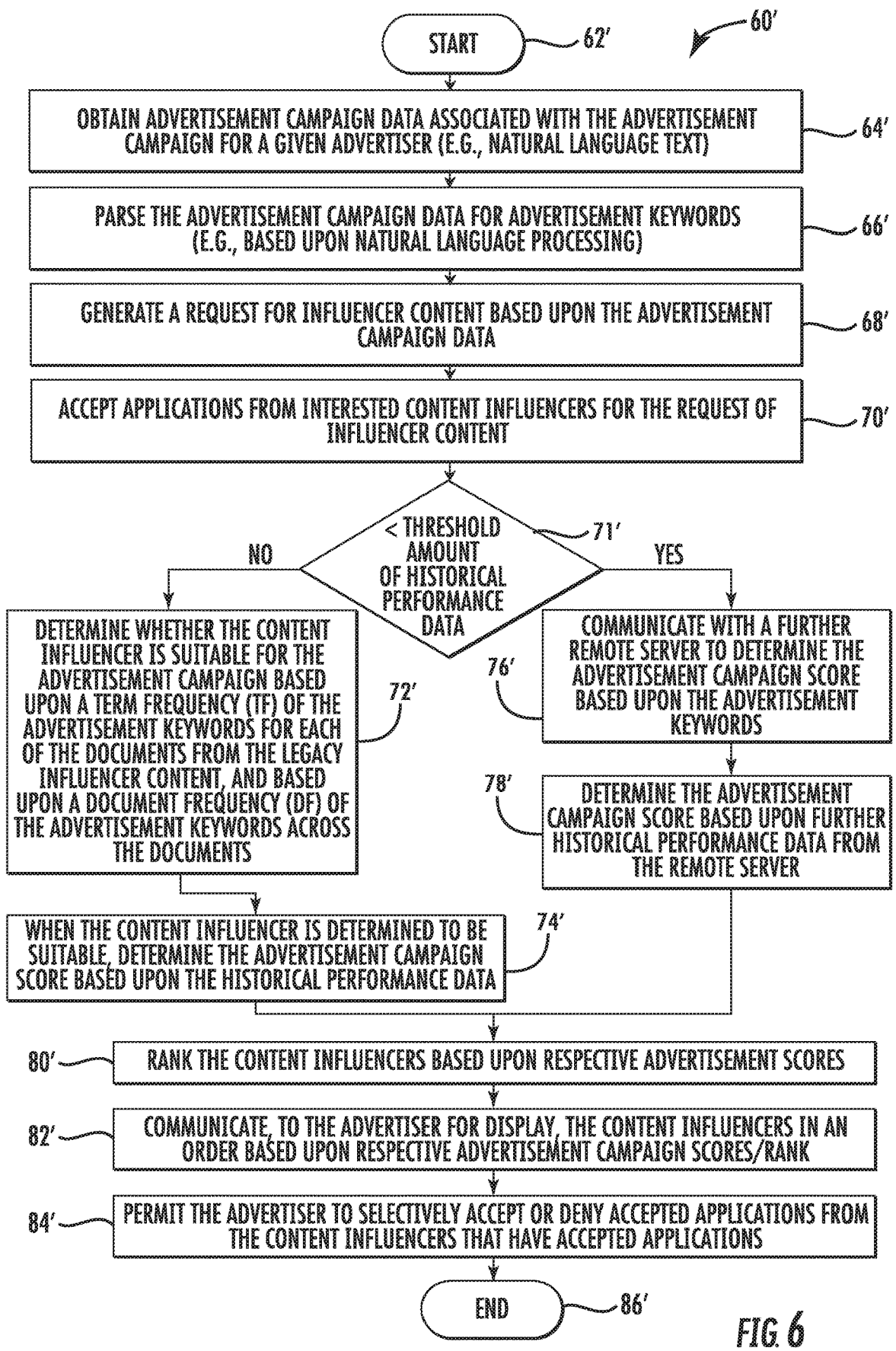
FIG. 6 is a flow chart illustrating operation of the remote server in FIG. 5.

Referring now to FIG. 5 and the flowchart 60' in FIG. 6, in another embodiment, the remote server 40' may communicate with a further remote server 47' or third party server when there may not be enough historical performance data 43' to make an advertisement campaign score determination. More particularly, at Block 71', the remote server 40' determines whether a content influencer has less than a threshold amount of historical performance data 43' (e.g., a new content influencer), and if so, the remote server communicates with the further remote server 47' to determine whether the content influencer 23' is suitable for the advertisement campaign 22' based upon the advertisement keywords (Block 76'). Using the advertisement keywords as input, the remote server 40' queries the further remote server 47' for further historical performance data 48' (i.e., out-of-network historical performance data) for suitable content influencers 23'. The further historical performance data 48' may include social reach and/or page views. The remote server 40' then determines whether the content influencer 23' is capable (Block 78') based upon the further historical performance data. The capability determination may be determined by calculating the advertisement campaign score for that particular content influencer 23' based upon the following equation:

Score=$w_1$+$w_2$*sqrt(social reach)+$w_3$*sqrt(homepage views)

wherein $w_x$ are respective weights.

The remote server 40' may rank the out-of-network content influencer with the other content influencers (in-network) and communicate all the content influencers 23' to the advertiser 21' for display.

If at Block 71', the content influencer 23' has enough legacy influencer content, the remote server 40' matches the content influencers to the advertisement campaign data 45' as described above with respect to the embodiments in FIGS. 1-4. Other steps illustrated but not specifically described in the present embodiment are similar to those described above with the respect to the embodiments in FIGS. 1-4 and need no further discussion herein.

A method aspect is directed to a method of scoring content influencers 23 in a system 20 that includes influencer computers 30a-30n each associated with a respective content influencer and configured to receive respective influencer content 24 associated with a given product for purchase. Each content influencer 23 may have influencer historical performance data 43 and legacy influencer content 44 associated therewith.

The method includes include using a remote server 40 coupled to each of the plurality of influencer computers 30a-30n to obtain advertisement campaign data 45 associated with an advertisement campaign 22 for a given advertiser 21 and parse the advertisement campaign data for advertisement keywords. The method also includes using the remote server 40 to match content influencers 23 to the advertisement campaign data 45 based on the plurality of advertisement keywords, and, for each content influencer, generate an advertisement campaign score. The advertisement campaign score is generated by at least determining whether the content influencer is suitable for the advertisement campaign 22 based upon a term frequency (TF) of the advertisement keywords for each of a plurality of documents from the legacy influencer content 44, and based upon a document frequency (DF) of the advertisement keywords across the plurality of documents, and, when the content influencer is determined to be suitable, determining the advertisement campaign score based upon the historical performance data.

A computer readable medium aspect is directed to a non-transitory computer readable medium for a content influencer scoring system 20 that includes influencer computers 30a-30n each associated with a respective content influencer 23 and configured to receive respective influencer content 24 associated with a given product for purchase. Each content influencer 23 may have influencer historical performance data 43 and legacy influencer content 44 associated therewith. The non-transitory computer readable medium includes computer executable instructions that when executed by a processor 41 of a remote server 40 coupled to each of the plurality of influencer computers 30a-30n causes the processor to perform operations. The operations include obtaining advertisement campaign data 45 associated with an advertisement campaign 22 for a given advertiser 21 and parsing the advertisement campaign data for a plurality of advertisement keywords. The operations also include matching content influencers 23 to the advertisement campaign data 45 based on the plurality of advertisement keywords, and, for each content influencer, generate an advertisement campaign score. The advertisement campaign score is generated by at least determining whether the content influencer 23 is suitable for the advertisement campaign 22 based upon a term frequency (TF) of the advertisement keywords for each of a plurality of documents from the legacy influencer content 44, and based upon a document frequency (DF) of the advertisement keywords across the plurality of documents, and, when the content influencer is determined to be suitable, determining whether the advertisement campaign score based upon the historical performance data 43.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A content influencer scoring system comprising:
a plurality of influencer computers each associated with a respective content influencer and configured to receive respective influencer content associated with a given product for purchase, each content influencer having influencer historical performance data and legacy influencer content associated therewith; and
a remote server coupled to each of the plurality of influencer computers and configured to
obtain advertisement campaign data associated with an advertisement campaign for a given advertiser, the advertisement campaign data being obtained as natural language text,
parse the advertisement campaign data for a plurality of advertisement keywords based upon natural language processing by at least identifying nouns from the natural language text and synonyms of the identified nouns, and
match content influencers to the advertisement campaign data based on the plurality of advertisement keywords, and for each content influencer, generate an advertisement campaign score by at least
determining whether an amount of influencer historical performance data for the content influencer exceeds a threshold, and when so
determining whether the content influencer is suitable for the advertisement campaign by at least determining a product of a term frequency (TF) of the advertisement keywords for each of a plurality of documents from the legacy influencer content, and a document frequency (DF) of the advertisement keywords across the plurality of documents, and
converting the product of the TF and the DF into a similarity matrix, and determining a cosine similarity between given documents of the plurality thereof to generate a cosine similarity matrix, the cosine similarity matrix being a measure of angular distance between advertisement keywords to match prior advertisement campaigns and to the content influencer, and
when the content influencer is determined to be suitable, determining the advertisement campaign score based upon a logistic regression using the historical performance data so that the advertisement campaign score is normalized to a scale representing a probability the content influencer is top ranked for the advertisement campaign relative to other content influencers and so that the remote server processes the historical performance data with increased processing speed, and
when the amount of influencer historical performance data for the content influencer does not exceed the threshold
communicate the plurality of advertisement keywords to a further remote server,
obtain further historical performance data from the remote server, the further historical performance data comprising social reach and page view data, and
generate the advertisement campaign score based upon a weighted sum of the social reach and page view data.

2. The content influencer scoring system of claim 1 wherein the remote server is configured to rank the content influencers in order based upon respective advertisement campaign scores.

3. The content influencer scoring system of claim 2 wherein the remote server is configured to communicate, to the advertiser for display, the content influencers in an order based upon the respective advertisement campaign scores.

4. The content influencer scoring system of claim 1 wherein the historical performance data comprises at least one of page-views, social followers, time-on-content, and amplification rate.

5. The content influencer scoring system of claim 1 wherein the remote server is configured to
generate a request for influencer content based upon the advertisement campaign data;
accept applications from the plurality of content influencers for the request for influencer content; and
permit the advertiser to selectively accept or deny accepted applications from ones of the plurality of content influencers that have accepted applications.

6. A remote server for a content influencer scoring system comprising a plurality of influencer computers each associated with a respective content influencer and configured to receive respective influencer content associated with a given product for purchase, each content influencer having influencer historical performance data and legacy influencer content associated therewith, the remote server coupled to each of the plurality of influencer computers and comprising:
a memory; and
a processor coupled to the memory and configured to
obtain advertisement campaign data associated with an advertisement campaign for a given advertiser, the advertisement campaign data being obtained as natural language text,
parse the advertisement campaign data for a plurality of advertisement keywords based upon natural language processing by at least identifying nouns from the natural language text and synonyms of the identified nouns, and
match content influencers to the advertisement campaign data based on the plurality of advertisement keywords, and for each content influencer, generate an advertisement campaign score by at least
determining whether an amount of influencer historical performance data for the content influencer exceeds a threshold, and when so
determining whether the content influencer is suitable for the advertisement campaign by at least determining a product of a term frequency (TF) of the advertisement keywords for each of a plurality of documents from the legacy influencer content, and a document frequency (DF) of the advertisement keywords across the plurality of documents, and
converting the product of the TF and the DF into a similarity matrix, and determining a cosine similarity between given documents of the plurality thereof to generate a cosine similarity matrix, the cosine similarity matrix being a measure of angular distance between advertisement keywords to match prior advertisement campaigns and to the content influencer, and
when the content influencer is determined to be suitable, determining the advertisement campaign score based upon a logistic regression using the historical performance data so that the advertisement campaign score is normalized to a scale representing a probability the content influencer is top ranked for the advertisement campaign relative to other content influencers and so that the processor processes the historical performance data with increased processing speed, and
when the amount of influencer historical performance data for the content influencer does not exceed the threshold
communicate the plurality of advertisement keywords to a further remote server,
obtain further historical performance data from the remote server, the further historical performance data comprising social reach and page view data, and
generate the advertisement campaign score based upon a weighted sum of the social reach and page view data.

7. The remote server of claim 6 wherein the processor is configured to rank the content influencers in order based upon respective advertisement campaign scores.

8. A method of scoring content influencers in a system comprising a plurality of influencer computers each associated with a respective content influencer and configured to receive respective influencer content associated with a given product for purchase, each content influencer having influencer historical performance data and legacy influencer content associated therewith, the method comprising:
using a remote server coupled to each of the plurality of influencer computers to
obtain advertisement campaign data associated with an advertisement campaign for a given advertiser, the advertisement campaign data being obtained as natural language text,
parse the advertisement campaign data for a plurality of advertisement keywords based upon natural language processing by at least identifying nouns from the natural language text and synonyms of the identified nouns, and
match content influencers to the advertisement campaign data based on the plurality of advertisement keywords, and, for each content influencer, generate an advertisement campaign score by at least
determining whether an amount of influencer historical performance data for the content influencer exceeds a threshold, and when so
determining whether the content influencer is suitable for the advertisement campaign by at least determining a product of a term frequency (TF) of the advertisement keywords for each of a plurality of documents from the legacy influencer content, and a document frequency (DF) of the advertisement keywords across the plurality of documents, and
converting the product of the TF and the DF into a similarity matrix, and determining a cosine similarity between given documents of the plurality thereof to generate a cosine similarity matrix, the cosine similarity matrix being a measure of angular distance between advertisement keywords to match prior advertisement campaigns and to the content influencer, and
when the content influencer is determined to be suitable, determining the advertisement campaign score based upon a logistic regression using the historical performance data so that the advertisement campaign score is normalized to a scale representing a probability the content influencer is top ranked for the advertisement campaign relative to other content influencers and so that the remote server processes the historical performance data as input to the logistic regression with increased processing speed, and when the amount of influencer historical performance data for the content influencer does not exceed the threshold communicate the plurality of advertisement keywords to a further remote server, obtain further historical performance data from the remote server, the further historical performance data comprising social reach and page view data, and generate the advertisement campaign score based upon a weighted sum of the social reach and page view data.

9. A non-transitory computer readable medium for a content influencer scoring system comprising a plurality of influencer computers each associated with a respective content influencer and configured to receive respective influencer content associated with a given product for purchase, each content influencer having influencer historical performance data and legacy influencer content associated therewith, the non-transitory computer readable medium comprising computer executable instructions that when executed by a processor of a remote server coupled to each of the plurality of influencer computers causes the processor to perform operations comprising:

obtaining advertisement campaign data associated with an advertisement campaign for a given advertiser, the advertisement campaign data being obtained as natural language text;

parsing the advertisement campaign data for a plurality of advertisement keywords based upon natural language processing by at least identifying nouns from the natural language text and synonyms of the identified nouns; and matching content influencers to the advertisement campaign data based on the plurality of advertisement keywords, and for each content influencer, generating an advertisement campaign score by at least determining whether an amount of influencer historical performance data for the content influencer exceeds a threshold, and when so determining whether the content influencer is suitable for the advertisement campaign by at least determining a product of a term frequency (TF) of the advertisement keywords for each of a plurality of documents from the legacy influencer content, and a document frequency (DF) of the advertisement keywords across the plurality of documents, and converting the product of the TF and the DF into a similarity matrix, and determining a cosine similarity between given documents of the plurality thereof to generate a cosine similarity matrix, the cosine similarity matrix being a measure of angular distance between advertisement keywords to match prior advertisement campaigns and to the content influencer, and when the content influencer is determined to be suitable, determining the advertisement campaign score based upon a logistic regression using the historical performance data so that the advertisement campaign score is normalized to a scale representing a probability the content influencer is top ranked for the advertisement campaign relative to other content influencers and so that the processor processes the logistic regression with increased processing speed, and when the amount of influencer historical performance data for the content influencer does not exceed the threshold communicate the plurality of advertisement keywords to a further remote server, obtain further historical performance data from the remote server, the further historical performance data comprising social reach and page view data, and generate the advertisement campaign score based upon a weighted sum of the social reach and page view data.

10. The remote server of claim 6 wherein the processor is configured to rank the content influencers in order based upon respective advertisement campaign scores.

11. The remote server of claim 10 wherein the processor is configured to communicate, to the advertiser for display, the content influencers in an order based upon the respective advertisement campaign scores.

12. The remote server of claim 6 wherein the historical performance data comprises at least one of page-views, social followers, time-on-content, and amplification rate.

13. The method of claim 8 wherein using the remote server comprises using the remote server to rank the content influencers in order based upon respective advertisement campaign scores.

14. The method of claim 13 wherein using the remote server comprises using the remote server to communicate, to the advertiser for display, the content influencers in an order based upon the respective advertisement campaign scores.

15. The method of claim 8 wherein the historical performance data comprises at least one of page-views, social followers, time-on-content, and amplification rate.

16. The non-transitory computer readable medium of claim 9 wherein the operations comprise ranking the content influencers in order based upon respective advertisement campaign scores.

17. The non-transitory computer readable medium of claim 16 wherein the operations comprise communicating, to the advertiser for display, the content influencers in an order based upon the respective advertisement campaign scores.

18. The non-transitory computer readable medium of claim 9 wherein the historical performance data comprises at least one of page-views, social followers, time-on-content, and amplification rate.

* * * * *